(12) United States Patent
Schuttenberg et al.

(10) Patent No.: US 9,116,742 B1
(45) Date of Patent: Aug. 25, 2015

(54) SYSTEMS AND METHODS FOR REDUCING INTERRUPT LATENCY

(75) Inventors: Kim Schuttenberg, Gilbert, AZ (US); Sujat Jamil, Gilbert, AZ (US); R. Frank O'Bleness, Tempe, AZ (US)

(73) Assignee: MARVELL INTERNATIONAL LTD. (BM)

( * ) Notice: Subject to any disclaimer, the term of this patent is extended or adjusted under 35 U.S.C. 154(b) by 619 days.

(21) Appl. No.: 13/550,755

(22) Filed: Jul. 17, 2012

Related U.S. Application Data

(60) Provisional application No. 61/509,969, filed on Jul. 20, 2011.

(51) Int. Cl.
*G06F 15/00* (2006.01)
*G06F 9/48* (2006.01)

(52) U.S. Cl.
CPC .................. *G06F 9/4812* (2013.01)

(58) Field of Classification Search
CPC ..................................................... G06F 9/4812
USPC .......................................................... 712/244
See application file for complete search history.

(56) References Cited

U.S. PATENT DOCUMENTS 5,889,973 A * 3/1999 Moyer .......................... 712/200
7,647,589 B1 * 1/2010 Dobrovolskiy et al. ........... 718/1

\* cited by examiner

*Primary Examiner* — Chun-Kuan Lee

(57) ABSTRACT

Systems, methods, and other embodiments associated with reducing interrupt latency are described. According to one embodiment, an apparatus includes a buffer storing instructions awaiting execution by an execution device. The apparatus also includes an interrupt logic that, in response to receiving an interrupt, classifies instructions as either safe or unsafe. An unsafe instruction will cause the instructions to execute in a manner inconsistent with an instruction set architecture. The interrupt logic also establishes an interrupt boundary between safe and unsafe instructions, and causes the interrupt to be processed at the interrupt boundary such that the interrupt is processed before processing of the unsafe instructions.

20 Claims, 4 Drawing Sheets

SYSTEMS AND METHODS FOR REDUCING INTERRUPT LATENCY

CROSS REFERENCE TO RELATED APPLICATIONS

This patent disclosure claims the benefit of U.S. Provisional Application No. 61/509,969 filed on Jul. 20, 2011, which is wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In computing systems, processors can be designed to work on several instructions simultaneously in order to boost performance. Instruction set architectures (ISAs) determine how instructions are to be executed by the processor. Typically, ISAs allow the execution of instructions in parallel if the results of executing the instructions in parallel are indistinguishable from the results if the instructions are executed serially. One complication of this is that a system has to wait to service an asynchronous event, commonly referred to as an interrupt, until all currently processing instructions have completed or can be safely prevented from completion. Consequently, the more instructions in execution simultaneously, the higher the performance of the processor. But there is a corresponding increase in the time it takes to complete these instructions before an interrupt can be serviced. The delay in executing the interrupt can adversely affect the performance of the processor in certain applications.

SUMMARY

In general, in one aspect this specification discloses an apparatus for reducing interrupt latency. Instructions are in a buffer awaiting execution by an execution device. The apparatus includes an interrupt logic that, in response to receiving an interrupt, classifies instructions as either safe or unsafe. An unsafe instruction will cause the instructions to execute in a manner inconsistent with an instruction set architecture. The interrupt logic also establishes an interrupt boundary between safe and unsafe instructions, and causes the interrupt to be processed at the interrupt boundary such that the interrupt is processed before processing of the unsafe instructions.

In general, in one aspect this specification discloses a device for reducing interrupt latency. The device includes a frontend logic configured to receive instructions. A buffer logic is configured to store the instructions. An execution device is configured to execute the instructions stored in the buffer logic. The device also includes an interrupt logic that classifies the instructions in a buffer awaiting execution by an execution device as either safe or unsafe in response to receiving an interrupt. An unsafe instruction causes the instructions to execute in a manner inconsistent with an instruction set architecture. The interrupt logic also establishes an interrupt boundary between safe and unsafe instructions and causes the interrupt to be processed at the interrupt boundary such that the interrupt is processed before processing of the unsafe instructions.

In general, in another aspect this specification discloses a method for reducing interrupt latency. The method includes receiving an interrupt. In response to receiving the interrupt, instructions in a buffer awaiting execution by an execution device are classified as either safe or unsafe. An unsafe instruction causes the instructions to execute in a manner inconsistent with an instruction set architecture. An interrupt boundary is established between safe and unsafe instructions. The interrupt is processed at the interrupt boundary such that the interrupt is processed before processing of the unsafe instructions.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with reducing or eliminating interrupt latency in processors. Interrupt latency is caused by a processing device waiting to execute an interrupt until currently executing instructions have completed or can be safely prevented from completion. Rather than forcing an interrupt to wait, an interrupt logic determines an interrupt boundary within the currently executing instructions and inserts the interrupt at the interrupt boundary for processing. To determine the interrupt boundary, the interrupt logic determines which instructions must appear to complete before the interrupt to meet the requirements of the instruction set architecture (ISA). The interrupt logic assigns states to the currently executing instructions and uses the assigned state information to identify the point within the instructions at which to begin the execution of the interrupt, thus avoiding having to wait for execution of all the currently executing instructions.

Instructions are assigned a state based on the downstream effects of executing the instruction. The state of an instruction determines whether the instruction is safe or unsafe. An interrupt boundary between safe instructions and unsafe instructions can be established for the instructions. The states (e.g., uncommitted, optionally committed, committed, retired) of the instructions are monitored so that an interrupt boundary can be established when an interrupt is received. Incoming interrupts can be executed at the interrupt boundary without interfering with the downstream effects of the instructions already in execution. Thus, by determining the states and establishing the interrupt boundary, as described in further detail below, it is possible to increase the responsiveness of the system to interrupts.

Figure 1A:
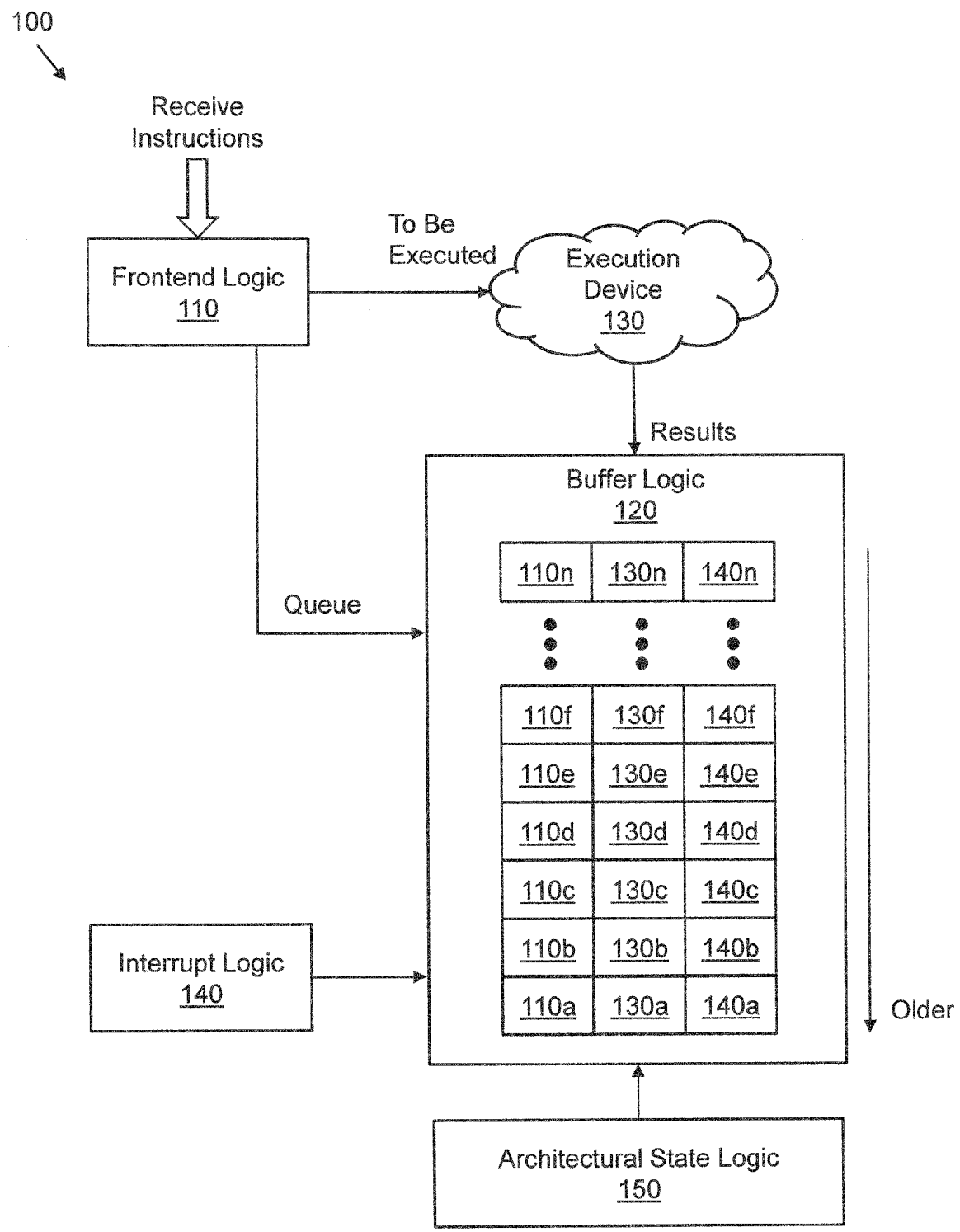
FIG. 1A illustrates one embodiment of an apparatus associated with reducing interrupt latency.

With reference to FIG. 1A, one embodiment of an apparatus 100 is shown that is associated with the reduction of interrupt latency. The apparatus 100 may be implemented in a computing device for high efficiency processing. In one embodiment, the apparatus 100 is implemented on a chip including one or more integrated circuits configured to perform one or more of the functions described herein. The apparatus 100 includes a front end logic 110, a buffer logic 120, and an execution device 130. An interrupt logic 140 and an architectural state logic 150 are in communication with the buffer logic 120.

The frontend logic 110 is configured to receive instructions (e.g., instructions 110a, 110b, 110c, 110d, 110e, 110f, to 110n). An instruction includes an operation to be executed. The instructions are sent to the buffer logic 120 and the execution device 130. The instructions are queued in the buffer logic 120 in program order. Alternatively, the buffer logic 120 may not store the instructions 110a to 110n, but instead store pointers to the instructions 110a to 110n. The instructions are added to the buffer logic 120 in the order that they are received. Thus, the instruction 110a is received and stored prior to the instruction 110n as illustrated by the "older" indicator arrow in FIG. 1. In one embodiment, the buffer logic 120 is a re-order buffer logic 120. The buffer logic 120 is configured to track the program order of the set of instructions as specified by the instruction set architecture ("ISA") used by the apparatus 100.

The execution device 130 includes at least one processor to execute the operations in the instructions to produce a set of results. The execution device 130 may include a plurality of processors forming a parallel processing network. The results include results 130a, 130b, 130c, 130d, 130e, 130f, to 130n corresponding to instructions 110a, 110b, 110c, 110d, 110e, 110f, to 110n. The results are stored in the buffer logic 120.

The interrupt logic 140 assigns states to the instructions. The states are stored in the buffer logic 120 at locations 140a to 140n. To determine the state of an instruction, the interrupt logic 140 analyses the program order of instructions as determined by the ISA. In one embodiment, the states include an uncommitted state, an optionally committed state, a committed state, or a retired state. The state of an instruction is based on the downstream effects (e.g., possibility of multiple results, decision branches, reversibility) of the operation associated with the instruction. In the example illustrated in FIG. 1A, the instruction 110f includes a store operation which is typically irreversible once executed. Thus, instruction 110f is committed and is assigned a committed state in 140f.

The ISA is enforced by the architectural state logic 150. The interrupt logic 140 monitors the states 140a to 140n of the instructions 110a to 110n so that the information about the states 140a to 140n can be used to classify an operation as safe or unsafe for determining the interrupt boundary. The architectural state logic 150 may select from a plurality of ISAs. For example, an ISA corresponds to a particular mode (e.g., system, administrator, execution level). The program order of the instructions is determined by the ISA selected by the architectural state logic 150.

Figure 1B:
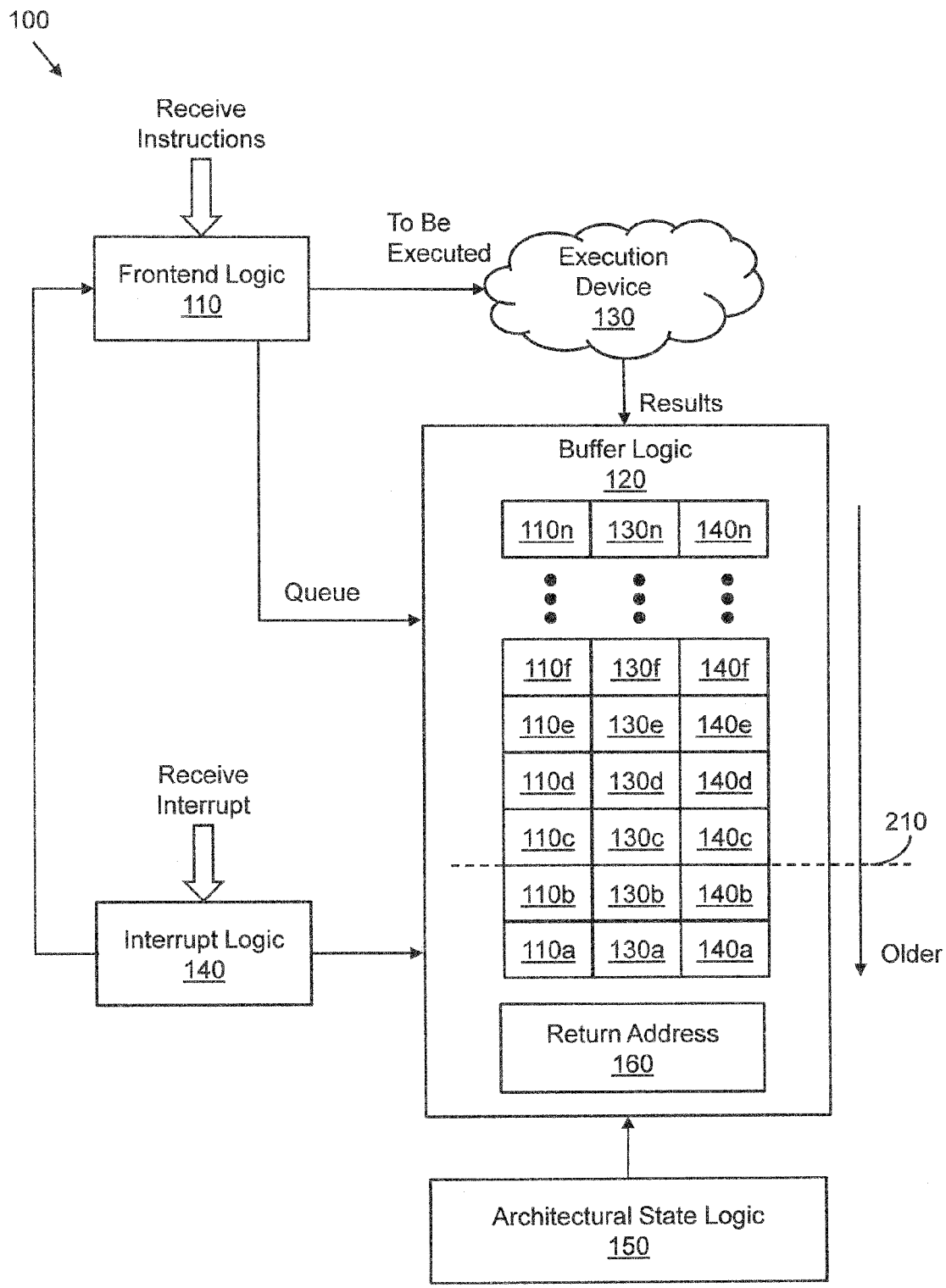
FIG. 1B illustrates one embodiment of an apparatus associated with reducing interrupt latency.

With reference to FIG. 1B, the interrupt logic 140 receives a request for an interrupt. In response, the interrupt logic 140 uses the states 140a to 140n to establish an interrupt boundary 210 within the instructions 110a to 110n. The interrupt boundary 210 is established between instructions that are classified as safe and instructions that are classified as unsafe based on their states. For example, in one embodiment, an uncommitted state and an optionally committed state are deemed unsafe (e.g., due to the conditional nature of the instruction as discussed in greater detail below), and a committed state and a retired state are deemed safe.

In FIG. 1B, the instructions 110a, 110b, 110c, 110d, and 110e below the interrupt boundary 210 have been classified as unsafe. The interrupt logic 140 marks instructions that are unsafe as not being part of the flow of execution. Marking instructions as not being a part of the flow of execution is commonly referred to as flushing or poisoning the instructions. Instructions 110f to 110n above the interrupt boundary 210 are classified as safe based on their state.

The interrupt logic 140 sends the received interrupt to the frontend logic 110. The interrupt is sent to the buffer logic 120 to be inserted in the instructions. The interrupt is also sent to the execution device 130 for execution. Because the interrupt logic monitors the states, the interrupt boundary can be readily identified and the interrupt can be executed in the proper order with respect to other instructions 110a to 100n in the buffer logic 120.

A return address 160 is stored in the buffer logic 120 by the interrupt logic 140. The return address 160 indicates which instruction processing starts with once the interrupt has been processed. The return address 160 is based on the address of the instruction after the last committed operation preceding the interrupt. Instruction 110b is the last committed operation before the interrupt boundary 210. Accordingly, the return address would point to instruction 110c. In the event that the last operation is a mispredicted branch, the return address would be the target of the mispredicted branch. Using the return address 160 stored in the buffer allows the execution device 130 to begin processing the instructions 110a to 110n as if the interrupt had not be received. The return address 160 may be stored using the push-stack method.

Figure 2:
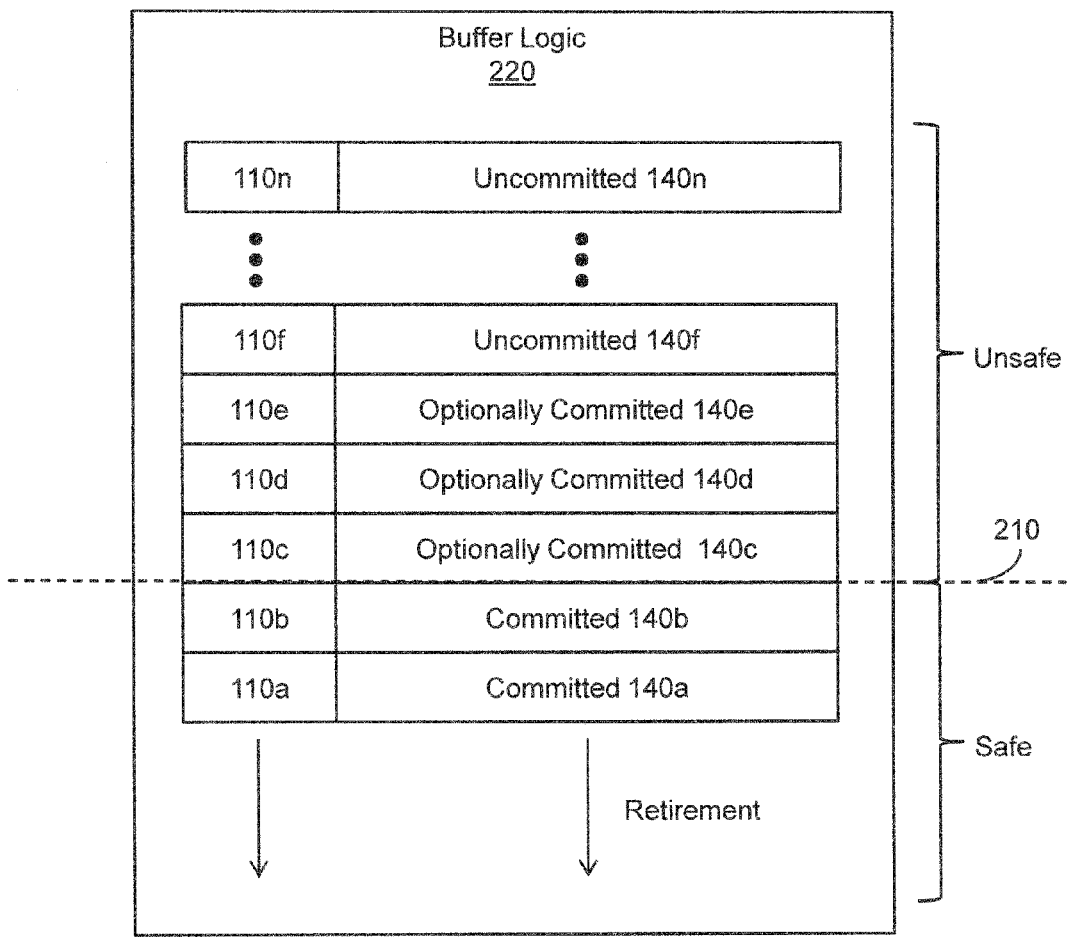
FIG. 2 illustrates one embodiment of interrupt processing with reduced latency

FIG. 2 illustrates operation of one embodiment of the interrupt logic (140, FIGS. 1A, 1B) in reducing interrupt latency. The set of instructions 110a to 110n are inserted in a buffer 220 in program order. The instructions in the buffer 220 are assigned states based on the downstream effects of performing the operation associated with the instruction. The possible states that can be assigned to the instructions 110a to 110n include uncommitted, optionally committed, committed, and retired. More or fewer state may be used based on the user needs, interrupt placement precision, and other concerns.

Instructions 110n and 110f are identified as uncommitted. Uncommitted instructions include operations that are codependent on other instructions in the buffer 220 or will affect or be affected by system settings. For example, an instruction that includes a decision with multiple possibilities resulting in a decision branch is an uncommitted instruction. The interrupt logic 140 (not shown) determines that instructions 110n and 110f are uncommitted. The instructions 110n and 110f are assigned corresponding uncommitted states 140n and 140f.

Instructions 110e, 110d, and 110c are identified as having an optionally committed status 140e, 140d, and 140c, respectively. An optionally committed status indicates that commitment is conditional and may be reversed. For example, an instructions 110e, 110d, and 110c are optionally committed because while there is no decision branch associated with the instructions 110e, 110d, and 110c, the operation associated with instructions 110e, 110d, and 110c has not yet been performed.

Instructions 110b to 110a are assigned a committed status 140b and 140a. Instructions that are committed cannot be changed or reversed. For example, an instruction is committed when the operation associated with instruction has been performed. The ISA sets the order in which instructions should appear to have been executed to the rest of the system despite being executed in parallel. In this example, the ISA determines the proper execution order is instructions 110a, 110b, 110c, 110d, 110e, 110f, to 110n. Accordingly, uncommitted instruction 110f must wait for the instructions 110a, 110b, 110c, 110d, and 110e to be executed before instruction 110f is retired. Therefore, instruction 110f is uncommitted. Instructions assigned retirement status are not shown because once an instruction is retired the instruction is no longer tracked by hardware.

Once the states have been assigned, the instructions are classified as either safe or unsafe based on their assigned state. In the illustrated embodiment, an instruction is classified as unsafe if it is uncommitted or optionally committed. An instruction is unsafe if execution of the instruction results in multiple possible outcomes. For example, an unsafe instruction may include a decision tree with conditional branches that have not yet resolved or memory operations that could produce synchronous exceptions. Thus, an instruction may be classified as unsafe due to the conditional nature of the instruction.

An instruction is classified as safe if the instruction is committed or retired. An instruction is classified as safe due to the unconditional nature of a committed or retired instruction. An instruction that has been executed is classified as safe if no previous operation will cause a change in the system if the order of the instructions was not predicted correctly. For example, assume the instructions 110a, 110b, 110c, and 110d are predicted to be executed in that order despite the instructions 110a, 110b 110c, and 110d being executed concurrently. Executing the instruction 110c before the instruction 110b will not affect execution or the change the predicted order of instructions 110a, 110b 110c, and 110d. Because 110b executes properly despite the order of the instructions and does not affect the other instructions, the instruction 110b is classified as safe.

The boundary between unsafe instructions and safe instructions is established as the interrupt boundary 210. The unsafe instructions are flushed, meaning the interrupt can be inserted before the unsafe instructions are executed. The interrupt can be placed at the interrupt boundary 210 or between safe instructions. The interrupt may also be placed between the optionally committed instructions. The system will ascertain which of the optionally committed instructions is safe and which are unsafe.

Figure 3:
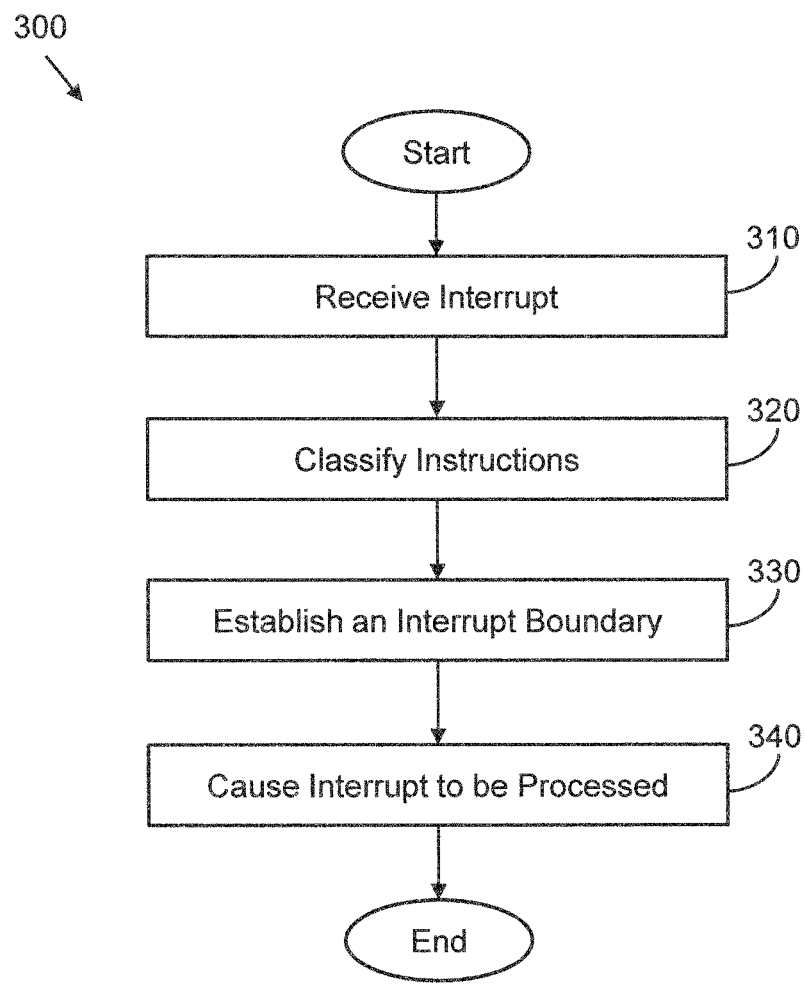
FIG. 3 illustrates one embodiment of a method associated with reducing interrupt latency.

FIG. 3 illustrates one embodiment of a method 300 associated with reducing interrupt latency. At 310, an interrupt is received. At 320, instructions are stored in a buffer awaiting execution by an execution device and are classified as either safe or unsafe. The ISA determines an order that the instructions are to appear to be executed. The instructions may be executed in order, out of order, or simultaneously, despite the order in which they appear to be executed. In one embodiment, an instruction is classified as being safe in response to execution of the instruction not causing a re-steer in an apparent order of execution of the instructions. An instruction is classified as being unsafe in response to execution the instruction causing a re-steer in the apparent order of execution of the instructions. A re-steer may indicate that the instructions are not being processed in the apparent order dictated by the ISA. In another embodiment, an instruction is classified as safe if the instruction has a committed state or a retired state. An instruction may be classified as unsafe if the instruction has an uncommitted state or an optionally committed state.

At 330, an interrupt boundary is established between safe and unsafe instructions. An interrupt includes a request for immediate execution. The interrupt boundary is determined when an interrupt is received. The states of the instructions are monitored throughout execution so that the interrupt boundary can be readily established in the instructions. At 340, the method includes causing an interrupt to be processed at the interrupt boundary such the interrupt is processed before processing of unsafe instructions. The unsafe instructions may be flushed to facilitate processing of the interrupt. Thus, the interrupt can be processed without being delayed while the unsafe instructions are processed. Thereby, reducing interrupt latency.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   an interrupt logic configured, in response to receiving an interrupt, to:
   i) classify instructions in a buffer awaiting execution by an execution device as either safe or unsafe, wherein an instruction is classified as unsafe when processing the interrupt prior to executing the instruction will cause the instruction to execute in a manner inconsistent with an instruction set architecture;
   ii) establish an interrupt boundary between safe and unsafe instructions; and
   iii) cause the interrupt to be processed at the interrupt boundary such that the interrupt is processed before processing of the unsafe instructions.

2. The apparatus of claim 1, wherein the interrupt includes a request for immediate processing.

3. The apparatus of claim 1, wherein the interrupt logic is configured to classify an instruction as safe when the instruction has a committed state or a retired state.

4. The apparatus of claim 1, wherein the interrupt logic is configured to classify an instruction as unsafe if the instruction has an uncommitted state or an optionally committed state.

5. The apparatus of claim 1, wherein the interrupt logic is configured to classify an instruction is classified as being safe in response to execution of the instruction not causing a re-steer in an order of execution of the instructions, and wherein an instruction is classified as being unsafe in response to execution the instruction causing a re-steer in the order of execution of the instructions.

6. The apparatus of claim 1, wherein the interrupt logic is configured to classify an instruction that can cause a change in the apparatus or be reversed as unsafe.

7. The apparatus of claim 1, further comprising a buffer logic configured to store the instructions, and wherein the instructions classified as unsafe are flushed from the buffer logic.

8. A device, comprising:
   a frontend logic configured to receive instructions;
   a buffer logic configured to store the instructions;
   an execution device configured to execute the instructions stored in the buffer logic; and
   an interrupt logic configured, in response to receiving an interrupt, to:
   i) classify instructions in a buffer awaiting execution by an execution device as either safe or unsafe, wherein an instruction is classified as unsafe when processing the interrupt prior to executing the instruction will cause the instruction to execute in a manner inconsistent with an instruction set architecture;
   ii) establish an interrupt boundary between safe and unsafe instructions; and
   iii) cause the interrupt to be processed at the interrupt boundary such that the interrupt is processed before processing of the unsafe instructions.

9. The device of claim 8, wherein the execution device is a processor, group of processors, or device configured to execute the instructions in parallel.

10. The device of claim 8, further comprising an architectural state logic configured to enforce the instruction set architecture, wherein the instruction set architecture determines the order that instructions appear to be executed by the execution device.

11. The device of claim 8, wherein the interrupt includes a request for immediate processing.

12. The device of claim 8, wherein the interrupt logic is configured to classify an instruction as safe if the instruction has a committed state or a retired state.

13. The device of claim 8, wherein the interrupt logic is configured to classify an instruction as unsafe if the instruction has an uncommitted state or an optionally committed state.

14. The device of claim 8, wherein the instructions are stored in a buffer logic, and wherein the instructions classified as unsafe are flushed from the buffer logic.

15. A method, comprising:
   receiving an interrupt;
   in response to the interrupt, classifying instructions in a buffer awaiting execution by an execution device as either safe or unsafe, wherein an instruction is classified as unsafe when processing the interrupt prior to executing the instruction will cause the instruction to execute in a manner inconsistent with an instruction set architecture;
   establishing an interrupt boundary between safe and unsafe instructions; and
   causing the interrupt to be processed at the interrupt boundary such that the interrupt is processed before processing of the unsafe instructions.

16. The method of claim 15, wherein the interrupt includes a request for immediate processing.

17. The method of claim 15, wherein an instruction is classified as safe if the instruction has a committed state or a retired state.

18. The method of claim 15, wherein an instruction is classified as unsafe if the instruction has an uncommitted state or an optionally committed state and flushing instructions classified as unsafe from the buffer.

19. The method of claim 15, wherein an instruction is classified as being safe in response to execution of the instruction not causing a re-steer in an apparent order of execution of the instructions, and wherein an instruction is classified as being unsafe in response to execution the instruction causing a re-steer in the apparent order of execution of the instructions.

20. The method of claim 19, further comprising enforcing an instruction set architecture, where the instruction set architecture determines the apparent order of execution of the instructions.

* * * * *